(12) United States Patent
Tran et al.

(10) Patent No.: US 10,702,835 B2
(45) Date of Patent: Jul. 7, 2020

(54) APPLIANCE FOR FOAMING BEVERAGE OR FOODSTUFF

(71) Applicant: NESTEC S.A., Vevey (CH)

(72) Inventors: Luan Vu Tran, Vufflens-la-Ville (CH); Xuan Mai Tu, Ecublens (CH); Alexa Perrin, Savigny (CH)

(73) Assignee: Societe des Produits Nestle S.A., Vevey (CH)

(*) Notice: Subject to any disclaimer, the term of this patent is extended or adjusted under 35 U.S.C. 154(b) by 189 days.

(21) Appl. No.: 15/753,484

(22) PCT Filed: Jul. 8, 2016

(86) PCT No.: PCT/EP2016/066274
§ 371 (c)(1),
(2) Date: Feb. 19, 2018

(87) PCT Pub. No.: WO2017/032501
PCT Pub. Date: Mar. 2, 2017

(65) Prior Publication Data
US 2018/0236413 A1    Aug. 23, 2018

(30) Foreign Application Priority Data
Aug. 25, 2015  (EP) .................................. 15182343

(51) Int. Cl.
*B01F 3/00* (2006.01)
*A47J 31/00* (2006.01)
(Continued)

(52) U.S. Cl.
CPC ............ *B01F 3/04453* (2013.01); *A23L 2/54* (2013.01); *A47J 31/4485* (2013.01);
(Continued)

(58) Field of Classification Search
CPC ................ A47J 31/4485; A47J 43/0465; A47J 43/0722; B01F 7/0045; B01F 15/00474;
(Continued)

(56) References Cited

U.S. PATENT DOCUMENTS

2015/0214801 A1* 7/2015 Libault .................. H02K 21/24
310/198

FOREIGN PATENT DOCUMENTS

| WO | 9826495 | 6/1998 |
|---|---|---|
| WO | 2014009858 | 1/2014 |

* cited by examiner

*Primary Examiner* — Anshu Bhatia
(74) *Attorney, Agent, or Firm* — K&L Gates LLP

(57) ABSTRACT

A stator operable to generate a rotating magnetic field for an electrical rotating machine, the stator comprising at least one circuit board with electrically conductive portions formed thereon, the electrically conductive portions connected with a multiphase configuration, wherein a phase comprises: on a first face of the circuit board(s) electrically conductive portions arranged as a plurality of elements, an element comprising a radially extending radial portion having: connected at a proximal end thereof a proximal portion, the proximal portion extending therefrom with a directional component in a first angular direction; and connected at a distal end thereof a distal portion, the distal portion extending therefrom with a directional component in a second opposed angular direction, whereby proximal and distal are defined relative the centre of rotation of the magnetic field and said angular direction is defined about said centre of rotation; and on a second face of the circuit board(s) electrically conductive portions comprising corresponding elements, whereby the proximal portion extends with a directional component in the second opposed angular direction and the distal portion extends with a directional component in the first angular direction.

9 Claims, 6 Drawing Sheets

(51) Int. Cl.
*B01F 3/04* (2006.01)
*H02K 3/26* (2006.01)
*H02K 21/24* (2006.01)
*A23L 2/54* (2006.01)
*A47J 31/44* (2006.01)
*A47J 43/046* (2006.01)
*A47J 43/07* (2006.01)
*B01F 7/00* (2006.01)
*B01F 15/00* (2006.01)
*B01F 15/06* (2006.01)

(52) U.S. Cl.
CPC ....... *A47J 43/0465* (2013.01); *A47J 43/0722* (2013.01); *B01F 7/0045* (2013.01); *B01F 15/00474* (2013.01); *B01F 15/00538* (2013.01); *B01F 15/065* (2013.01); *H02K 3/26* (2013.01); *H02K 21/24* (2013.01); *A23V 2002/00* (2013.01); *B01F 2215/0006* (2013.01); *H02K 2203/03* (2013.01)

(58) Field of Classification Search
CPC .............. B01F 15/00538; B01F 15/065; B01F 2215/0006; H02K 3/26; H02K 21/24; H02K 2203/03; A23V 2002/00
See application file for complete search history.

APPLIANCE FOR FOAMING BEVERAGE OR FOODSTUFF

CROSS REFERENCE TO RELATED APPLICATIONS

The present application is a National Stage of International Application No. PCT/EP2016/066274, filed on Jul. 8, 2016, which claims priority to European Patent Application No. 15182343.2, filed on Aug. 25, 2015, the entire contents of which are being incorporated herein by reference.

TECHNICAL FIELD

The present invention relates to a stator for an electrical rotating machine and to an appliance comprising the stator for the foaming of a beverage or foodstuff.

BACKGROUND

It is desirable to foam (i.e. to aerate to a froth by the trapping of air pockets) beverages or foodstuffs, or components thereof, during beverage preparation. One example is milk that is foamed with coffee added thereto to form a latté or a cappuccino. A further example is the whisking of egg whites or cream to a mousse.

Accordingly various appliances exist to automate a foaming process. An example of one such appliance is disclosed in WO 2006/050900, wherein a container for containing a liquid to be foamed has arranged therein a rotary agitator which is rotated for said foaming. In particular, the rotary agitator is part of an agitation system that further comprises: permanent agitator magnets incorporated on the rotary agitator; permanent drive magnets arranged external the container; a rotor operable to rotate said drive magnets, whereby rotation of the drive magnets effects a rotating magnetic field to transmit torque to the agitator magnets.

In particular the rotor is driven by an electrically operated motor, which is arranged beneath the container. A drawback with such an arrangement is that the housing of the appliance has to house said motor and the drive magnets, both of which are bulky and impose size constraints on the housing, which is undesirable for reasons material wastage and economy of space on a worktop. A further drawback is that said drive magnets are limited in the amount of torque they can apply to the whisk by virtue of their degree of magnetisation.

SUMMARY OF THE INVENTION

An object of the invention is to provide an electric motor stator for an agitation system which is compact.

It would be advantageous to provide stator that is cost effective to manufacture and/or assemble.

It would be advantageous to provide a stator capable of applying high torque to a rotary agitator.

Objects of the invention are achieved by: the stator disclosed herein, the appliance disclosed herein and the method disclosed herein.

Disclosed herein according to a first aspect of the invention is a stator for an electrically rotating machine. The electrical rotating machine may comprise a motor, such as a pancake or axial rotor motor. The electrical rotating machine may comprise an electrical generator. Preferably the electrical rotating machine comprises the appliance according to the second aspect.

The stator is operable to generate a rotating magnetic field for an electrical rotating machine, the stator comprising at least one circuit board with electrically conductive portions formed thereon, the electrically conductive portions connected with a multiphase configuration, wherein a phase comprises: on a first face of the circuit board(s) electrically conductive portions arranged as a plurality of elements, an element comprising a radially extending (i.e. exactly radially or generally radially) radial portion having: connected at a proximal end thereof a proximal portion, the proximal portion extending therefrom with a directional component in a first angular direction (i.e. using a polar coordinate system, with a reference point at the centre of rotation of the magnetic field and an arbitrary reference direction extending therefrom, the component of extension in the particular angular direction from the reference direction at the reference point); and connected at a distal end thereof a distal portion, the distal portion extending therefrom with a directional component in a second opposed angular direction, whereby proximal and distal are defined relative the centre of rotation of the magnetic field and said angular direction is defined about said centre of rotation; and on a second face of the circuit board(s) electrically conductive portions comprising corresponding (i.e. in shape, but reflected in along a line coincident to the radial portion) elements, whereby the distal and proximal portions of said elements extend with directional components in the opposed angular directions to those on the first face (i.e. the distal portion of the first face extends in the opposed angular direction to the distal portion of the second face and the proximal portion of the first face extends in the opposed angular direction to the proximal portion of the second face). Generally the radial, distal and proximal portions are linear, although they may alternatively be partially curved. The first angular direction can be one of anticlockwise or clockwise and the second angular direction can be the other of anticlockwise or clockwise about the centre of rotation of the magnetic field (i.e. the reference point).

The opposed extensions of the radial and proximal portions thus permit convenient connection of the elements between the faces. Generally the distal portion extends with a further directional component in a radial direction away from the centre of rotation. Generally the proximal portion extends with a further directional component in a radial direction towards the centre of rotation.

Advantageously, the configuration of the elements of the stator permits a dense packing of the electrically conductive portions comprising the phases. Thus the stator can generate a high strength magnetic field and thus transfer a high torque to the rotor.

Advantageously, the above arrangement of elements can be formed cost-effectively and adaptively. In particular, during assembly the number of phases and phase configurations can be selected by choosing which elements to interconnect. Moreover the second face comprises the same print as the first face, hence a plurality of the same prints can be formed and appropriately oriented to define the first and second face.

The stator may be generally disc shaped. The stator may be arranged generally perpendicular to the axis of rotation of said field. The circuit board(s) comprise a non-conductive material, such as polyethylene terephthalate (PET) or glass fibre reinforced (fiberglass) epoxy resin. The electrically conductive material generally comprises a metal, such as copper. The electrically conductive material can be formed on the circuit board by known means, e.g. etching or printing. Advantageously the electrically conductive portions are formed conveniently with a high level of precision.

In an example comprising electrically conduction portions arranged on 2 faces, said face may comprise both faces of a single circuit board, or single faces of two circuit boards. In a similar fashion further faces and circuit boards can be added. In an arrangement comprising further faces the elements on the further faces may comprise corresponding arrangements, e.g. a third face corresponding to the first face and a fourth face corresponding to the second face and so on.

The stator may comprise one or a plurality (e.g. and number between 1 and 20, such as 2, 3, 4, 6) of said circuit boards, whereby the plurality of said boards are arranged in the form of a stack (e.g. layered in a generally of fully overlapping arrangement), preferably with the centres thereof aligned to the axis of rotation of the field. The plurality of circuit boards are fixed together, e.g. bonded, to form a laminate. Advantageously the plurality of boards enables a high current density in the stator and thus a high magnetic field strength for transmission of high torque. The stator may comprise a circuit board with electrically conductive portions formed on one or both faces of the circuit board. Advantageously forming the electrically conductive portions on both faces of a circuit board enables a high current density in the stator and thus a high magnetic field strength for transmission of high torque. In the example wherein there is a plurality of circuit boards with adjacent faces thereof comprising electrically conductive portions an electrical insulator, e.g. an isolant such as a glass fibre, epoxy resin, is preferably arranged between the circuit boards.

The multiphase configuration comprises any suitable plurality of phases e.g. 2, 3, 4, 5, 6. Preferably a 3 phase configuration is utilised. A phase herein is defined conventionally with respect to electrically operated motors, e.g. each phase comprises an independent arrangement of electrically conductive portions arranged to generate a static magnetic field at a particular position when a current travels therethrough. A rotating magnetic field is achieved by sequentially switching the current through the phases, e.g. a phase is switched on by the application of current with a square wave or other suitable waveform. The electrically conductive portions of each phase may be arranged to be multipolar, e.g. with 2, 3, 4, 5 or other suitable number of pole pairs. Advantageously, having multiple pole pairs enables smooth torque delivery, and in particular a complex arrangement of many poles can be conveniently and precisely formed on the circuit boards using one of the aforesaid methods. The said multiphase, multipolar configuration is preferably configured to generate a rotating magnetic field to transmit torque to a corresponding multipolar permanent magnet arrangement of a rotor, e.g. a rotary agitator according to the second aspect.

The elements preferably have substantially an S-shape on the first face. The elements preferably have substantially a Z-shaped on the second face. Generally the second face comprises the same arrangement of elements as the first face but with the reverse formation of elements.

The proximal portions on the first face may be connected to the proximal portions on the second face. The distal portions on the first face may be connected to the distal portions on the second face. The said connections generally comprise vias, preferably at a tip of said portions, which optionally extend through the board(s). Generally the vias may be the through extending type. Advantageously the efficiency of the active portions of the elements is enhanced since the vias do not interfere with their positioning/arrangement, and thus magnetic field generation.

The phases may comprise, for each face that comprises the electrically conductive portions (i.e. for the first and second face, and further optional examples comprising a third and fourth face) interconnected arrangements of least two (e.g. 2, 3, 4, or more) elements of the same configuration arranged adjacent each other. The adjacent elements on a face (e.g. of said arrangement or in general) may be offset in said angular direction by 5-45° or 5-20°, preferably by about 15°. On a face, (i.e. for each face that comprises the electrically conductive portions) the arrangements preferably alternate sequentially between the phases. Preferably for each phase the arrangements are serially interconnected between the faces.

The electrically conductive portions may be further arranged on third and fourth faces of at least one further circuit board, the arrangement of the electrically conductive portions on the third and fourth faces corresponding to those on the respective first and second faces, whereby elements (e.g. of said arrangements) of corresponding phase are superposed and/or offset in the angular direction but in operative proximity to define corresponding magnetic poles of the phases.

For each phase the elements may be arranged into active portions, whereby each active portion is configured to generate a magnetic pole for said torque transmission. An active portion can be defined as a generating a north pole or a south pole of a pole pair for torque transmission. An active portion comprises an arrangement of elements on a first face, and an arrangement of elements on a second face, said arrangements connected to each other. In particular, the active portion generally comprises for an element: the radial portion and a region of the distal and/or proximal portion arranged in operative proximity thereto. Generally the active portions are circumferentially and equidistantly disposed on a face about the axis of rotation of the magnetic field. For each phase the adjacent active portions are preferably serially interconnected and configured to generate magnetic poles of alternating polarity.

The phases may be symmetrically disposed about a central plane, the central plane being arranged centrally in a through-thickness direction of the circuit boards, e.g.: for a two face arrangement with a single circuit board the phases are evenly distributed on the first and second face; for a four face arrangement with two circuit boards the phases are evenly distributed on the first-fourth face. Advantageously, with the aforedescribed symmetric arrangement of the phases the magnetic field strength at the rotary agitator is substantially the same for each phase, which result in a more uniform transfer of torque to the rotor together with increased efficiency.

The element may be 0.25-2 mm in thickness (i.e. in the planar direction of the stator). The elements of the active portions may be narrower in thickness and more densely packed along the radial portions rather than the distal and/or proximal portions, e.g. they are less than 50% or 75% of the thickness at the distal and/or proximal portions. Advantageously, the increased width of the interconnecting portions enables improved heat dissipation.

Disclosed herein according to a second aspect of the invention is an appliance (e.g. for home use by an end user) to foam (e.g. to aerate or froth) a liquid for consumption, the appliance comprising: a container mounting portion to mount (e.g. removably or permanently mounted) thereto a container to contain said liquid; an agitation system configured to foam said liquid, said system comprising a stator according to the first aspect, said stator arranged external a mounted container (e.g. beneath a base of a mounted container), said stator configured to generate a rotating magnetic field for transmission of torque to rotate a rotary agitator arranged in a mounted container. The rotary agitator and stator thus form an electric motor. The rotating magnetic field thus extends into a mounted container and rotates therein.

Accordingly an object of the invention is achieved since the stator of the appliance is particularly compact in comparison to the prior art, which comprises arranged within the appliance a motor driving permanent magnets. Moreover, a stator formed with electrically conductive portions on a circuit board can be conveniently and precisely formed when compared to a coiled wire arrangement. Furthermore it has enhanced heat dissipation.

The stator may be arranged generally perpendicular to the axis of rotation of said field. The stator preferably extends parallel to a base of a mounted container. The stator may extend over a substantial portion of a base of a mounted container, e.g. an overlap of at least 90% or all of the area of the base of a mounted container. Advantageously, the magnetic field is generated over a large surface area and can thus induce a large amount of torque in the rotary agitator. The stator preferable extends parallel to a base of a mounted container. The stator is preferably arranged adjacent a base of the container, e.g. a mounted container sits is at least partially supported by the stator, and sits on the stator with an optional insulating material therebetween. The container mounting portion may be configured for permanent or removable attachment of the container, e.g. a bonded, force fit, or screw fit. Advantageously a container which is removable can be removed for cleaning. An exterior surface of the stator proximal the container may comprise a protective coating for mounting the container thereon. Advantageously, the appliance is compact.

The appliance may comprise a container to contain said liquid for mounting to said mounting portion (e.g. it may be mounted to the mounting portion). The appliance may comprise a rotary agitator for arrangement in said container (e.g. it may be arranged in said container), wherein the rotary agitator comprises one or more agitator magnets defining magnetic poles for transmission of torque from the magnetic field generated by the stator to the rotary agitator (e.g. the other components of the rotary agitator).

The container may comprise at a base thereof a location member for location of the rotary agitator. The location member is preferably located such that when the container is mounted it is at a centre of rotation of the magnetic field.

The rotary agitator may comprise an array of magnetic poles circumferentially disposed about an axis of rotation. The poles may be formed of discrete magnets, e.g. magnets that comprises single pole pairs, or magnets that comprise a plurality of pole pairs.

Disclosed herein according to a third aspect of the invention is a method of foaming a liquid for consumption using the appliance according the second aspect, said method comprising: generating a rotating magnetic field by applying electrical energy to electrically conductive portions of the stator; rotating a rotary agitator arranged in a container for container liquid by applying a torque from said field to the rotary agitator. The method may comprise filling the container with liquid to be foamed. Generating a rotating magnetic field may comprise sequentially switching the electrical current between the phases of the stator, e.g. by means of a processor.

Disclosed herein according to a fourth aspect is an electrical rotating machine comprising the stator according to the first aspect. The electrical rotating machine may comprise a motor, such as a pancake or axial rotor motor. The electrical rotating machine may comprise an electrical generator. The electrical rotating machine may comprise the appliance according to the second aspect. The electrical rotating machine may comprise a rotor to output rotary motion, said rotor comprising and an array of permanent magnets for interaction with the magnetic field of the stator.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and accompanying drawings.

BRIEF DESCRIPTION OF THE DRAWINGS

For a better understanding of the invention, and to show how embodiments of the same may be carried into effect, reference will now be made, by way of example, to the accompanying drawings in which:

FIG. 6b is an illustrative diagram of phase 2 derived from the same example as FIG. 6a;

FIG. 6c is an illustrative diagram of phase 3 derived from the same example as FIG. 6a;

DETAILED DESCRIPTION OF EXEMPLARY EMBODIMENTS

Appliance for Foaming

Figure 1:
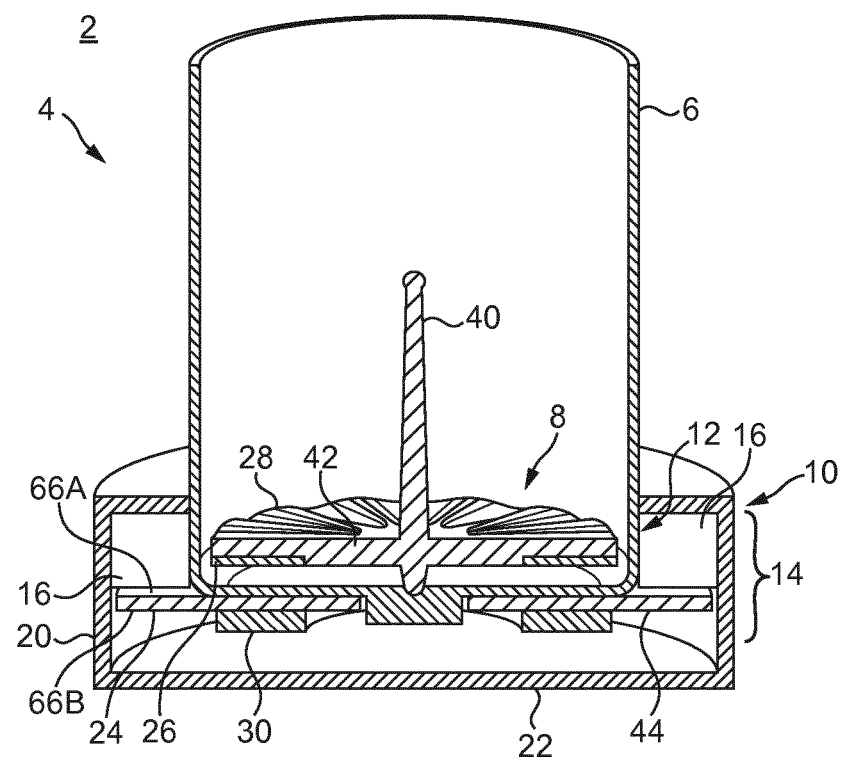
FIG. 1 is an illustrative sectional view of an embodiment of an appliance to foam a liquid for end user consumption.

An appliance for foaming 2, an example of which is illustrated in FIG. 1, comprises at a first level thereof: a base unit 4 to transmit torque to a rotary agitator; a container 6 to contain liquid for end user consumption; a rotary agitator 8 to foam said liquid, which are described sequentially as follows.

Base Unit

The base unit 4 transmits torque to the rotary agitator 8 by means of a magnetic field, and comprises at a first level thereof: a housing 10; container mounting portion 12; agitation system 14; optionally a heater 16; control system 18, which are sequentially described as follows.

Housing

The housing 10 houses and supports said first level components and comprises: a base 22 for abutment of a horizontally arranged support surface; a body 20 for mounting thereto the other first level components.

Container Mounting Portion

The container mounting portion 12 is operable to mount the container 6 to the base unit 4. The container mounting portion 12 may be configured for permanent mounting of a container, e.g. it comprises a surface for locating the container to which the container can be bonded. Preferably the container mounting portion 12 is configured for removable attachment to the container, e.g. it comprises a force fit or screw fit. An advantage of a removable attachment is that the container 6 can be detached from the base unit 4 for cleaning. The mounting portion 12 may comprise the stator with an optional a protective coating (e.g. an insulating lacquer or a glass fibre epoxy resin) on an outer surface thereof for mounting the container 6 thereon.

Agitation System

The agitation system 14 is operable to foam liquid in the container 6 by mechanical agitation, in particular by transmission of torque via a magnetic field to a rotary agitator 8, and comprises: a stator 24; a rotary agitator 8; an optional core 30.

The stator 24 is operable to receive phased electrical energy and to generate therefrom a rotating magnetic field. The stator 24 comprises at least one circuit board with electrically conductive portions formed thereon and is discussed in more detail later on.

The rotary agitator 8 comprises an array of magnetic poles that are circumferentially disposed about an axis of rotation for interaction with the rotating magnetic field generated by the stator 24. Agitator magnets 26 of the rotary agitator 8 form said poles and comprise a magnetically hard material capable of a persistent magnetic field. The magnets 8 are configured the transmission of torque derived from their interaction with the rotating magnetic field to the remainder of the rotary agitator 8. The magnets 26 may comprise discrete units with each comprising a north and south pole. Alternatively one or more of the units may be integrated, e.g. in an annular ring. Other components of the rotary agitator 8 are discussed in more detail later on.

The optional core 30 is for enhancing the rotating magnetic field and typically comprises a ferromagnetic metal such as iron. The core 30 is in general an axially arranged toroid or annular ring positioned proximal a face of the stator 24 that is distal the container 6.

Heater

The optional heater 16 is operable to heat the liquid in the container 6. Preferably the heater 16 comprises an induction coil operable to heat by electromagnetic induction the rotary agitator 8. Alternatively it may heat the container 6, e.g. the heater comprises a resistive element for heating by conduction.

Control System

Figure 2:
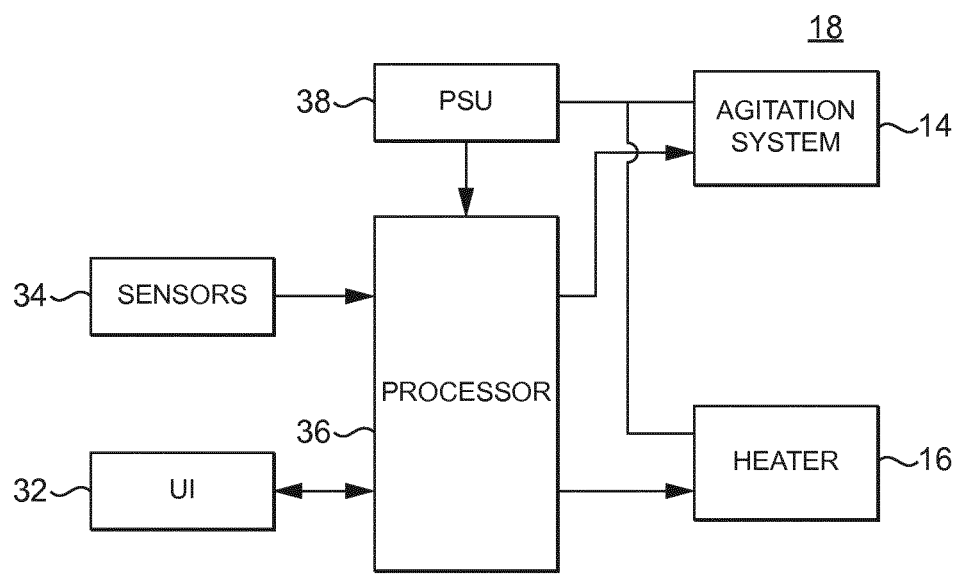
FIG. 2 is block diagram of a control system for the appliance of FIG. 1.

The control system 18, an example of which is illustrated in FIG. 2, is operable to control the agitation system 14 and optional heater, and generally comprises: a user interface 32; optional sensors 34; processor 36; power supply 38, which are described sequentially.

The user interface 32 comprises hardware to enable an end user to interface with the processor 36 and hence is operatively connected thereto. More particularly: the user interface receives commands from a user; a user interface signal transfers the said commands to the processor 36 as an input. The commands may, for example, be an instruction to execute a foaming process and/or a heating process. The hardware of the user interface 32 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 34 are operatively connected to the processor 36 to provide an input for monitoring said process. The sensors 40 typically comprise one or more of the following: liquid temperature sensors; liquid level sensors; position sensors (e.g. hall sensors) for sensing a position of the magnets of the rotary agitator 8 with respect to the stator as will be discussed.

The processor 36 is generally operable to: receive an input, i.e. the commands from the user interface 32 and/or from the sensors 34; process the input according to program code stored on a memory unit (or programmed logic); provide an output, which is generally the said foaming process and/or a heating process. The process may be executed with open-loop control, or more preferably with closed-loop control using the input signal from the sensors 34 as feedback. The processor 36 generally comprises memory, input and output system components, which are arranged as an integrated circuit, typically as a microprocessor or a microcontroller. The processor 36 may comprise other suitable integrated circuits, such as: an ASIC; a programmable logic device such as an FPGA; an analogue integrated circuit such as a controller. The processor 36 may also comprise one or more of the aforementioned integrated circuits, i.e. multiple processors. An example of a suitable component of a processor for stator control is the ESCON 36/3 motor controller by Maxon, which may be controlled by a further processor.

The processor 36 generally comprises a memory unit for storage of the program code and optionally data. Typically the program code encodes a foaming process. The memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The power supply 38 is operable to supply electrical energy to the processor 36, agitation system 14 and heater 16. The power supply 38 may comprise various means, such as a battery or a unit to receive and condition a mains electrical supply.

Container

The container 6, and example of which is illustrated in FIG. 1, is operable to contain the liquid for foaming. Typically the container has a capacity of 0.2-0.5 litres. The container 6 may be cylindrical (6). The container is generally formed of a material that is suitably transparent to a magnetic field, e.g. glass.

The liquid to be foamed in the container is generally any potable liquid including foodstuffs. Typically it is milk or comprises milk.

Rotary Agitator

The rotary agitator 8, an example of which is illustrated in FIG. 1, is operable to rotate to agitate the liquid in the container 6 to effect its foaming. The rotary agitator 8 comprises: an axially extending body 40; a support portion 42, radially extending from said body 40 for supporting the agitation portion 28 and the agitator magnets 26. The agitation portion 28 may be contoured (as illustrated) or otherwise formed (e.g. comprising holes) to effect fluid agitation upon rotation. The body 40 comprises at an end thereof a location member configured to engage with a complimentary location portion of the container 6, e.g. an extension on one of the body 40 or container 6 for insertion into a cavity on the other of the body 40 or container 6.

The arrangement and pole configuration of the agitator magnets 26 of the rotary agitator 8 is complementary to the poles of the stator 24, e.g. for the later discussed example stator configuration shown in FIGS. 3 and 4, wherein the stator comprises 8 poles, i.e. 4 pole pairs, there are the same number of poles in the rotary agitator, which are arranged at a complimentary radial distance from the centre of rotation of the magnetic field.

Stator

The stator 24, an idealisation of which is shown in FIG. 1, comprises a circuit board(s) 44 and electrically conductive portions 46 arranged on first 66A and second 66B surfaces thereof. The stator 24 may be arranged proximal a base of the container 6 such that it is in operative proximity to the rotary agitator 8, and example of such an arrangement is shown in FIG. 1. In particular, it may fully or at least partially overlap (e.g. by covering at least 80% or 90% of the surface area of the base) said base of the container 6. Typically the stator 24 is disc shaped with the axis of rotation of the associated magnetic field arranged at a centre thereof, however it will be appreciated that it may comprise other shapes. The diameter of the stator (when in disc form) may be 5 cm-15 cm. The thickness of an individual circuit board is selected for suitable thermal conduction, e.g. 1-2, such as 1.6 mm±0.15 mm.

The electrically conductive portions 46 and circuit board(s) 44 may have various configurations as will be discussed. They are arranged to effect a multipolar (e.g. 2, 3, 4, 6 or more pole pairs), multiphase (e.g. 2, 3, 4 or more phase) motor configuration, which incorporates a rotor comprising the agitator magnets 26 of the rotary agitator 8. More particularly, the stator and rotor are configured to effect a brushless DC or AC synchronous motor configuration. The electrically conductive portions 46 are arranged to define active portions 48 for generation of the magnetic poles. The poles are connected in phases, whereby the individual phases can be switched sequentially to effect rotation of a magnetic field. In particular and active portion is configured to generate one pole (i.e. with a magnetic field vector which is in the north or south direction) of a pole pair.

The electrically conductive portions 46 are arranged over at least two faces 66A, 66B of circuit board(s) 44, e.g. both faces of a single circuit board or two faces of a laminate of a plurality of boards. On the first face 66A of said circuit board(s) the electrically conductive portions 46 are arranged as a plurality of elements 48, an example of which is shown in FIG. 3 (which shows the elements of the first phase only). Herein it is convenient to use a polar coordinate system when defining the orientation of the elements 48. The polar coordinate system is defined with: a reference point 68 at the centre of rotation of the magnetic field (which is also generally the centre of the stator 24); and a reference direction 70 arbitrarily extending towards the top of the page. In accordance with the polar coordinate system distal and proximal are defined relative the reference point 68. Moreover a line comprising an element 48 can be considered to have vector components that extend in a first or second angular direction about the reference point 68 and radially inward or outward.

The elements 48 comprise radial portions 50, which extend generally in a radial direction. Connected at a proximal end of the radially portions 50 is a proximal portion 54, which extends from the radial portion 50 with a first directional component a first angular direction (herein anti clockwise) and with a second directional component radially inward. More particularly an angle between the radially extending portion 50 and proximal portion 54 is in the range of 120-160°, preferably it is about 140°. In a similar fashion connected at a distal end of the radial portions 50 is a distal portion 52, which extends from the radial portion 50 with a first directional component in the a second opposed angular direction (i.e. herein clockwise) and with a second directional component radially outward. More particularly an angle between the radial portion 50 and distal portion 52 is in the range of 110-70°, preferably it is about 90°. In particular on the first face 66A the elements 48 have a shape that generally resembles an 'S'.

The elements 48 are offset from each other typically by 5-20° (in the illustrated example the offset is 15°). Generally all of the elements on a face are equidistant in their arrangement. In one example, single elements 48 comprise a phase, with adjacent elements comprising different phases. Alternatively, in a preferred example, a phase comprises an arrangement 56 of a plurality (e.g. 2, 3, 4 or more) of elements 54 adjacent each other, with like arrangements of other phases arranged adjacent thereto. In FIG. 3 the first phase only is shown which comprises 2 elements with such arrangements 56, FIG. 4 shows the same arrangements 56 with the remaining phases 2 and 3 added. In particular for a phase there may be any suitable number of arrangements 56 equidistantly distributed on a face, the amount of which define the number of magnetic poles of the phase. In the example of FIGS. 3 and 4 there are 4 arrangements 56 arranged at 90° intervals for each phase. FIG. 4 in particular shows the sequential arrangements of phase 1 58, phase 2 60 and phase 3 62. It will be appreciated from FIG. 4 that the aforesaid arrangement of elements and their configuration permits an extremely dense packing of the electrically conductive portions 46 on the stator 24, and thus a particular efficient stator.

Figure 5:
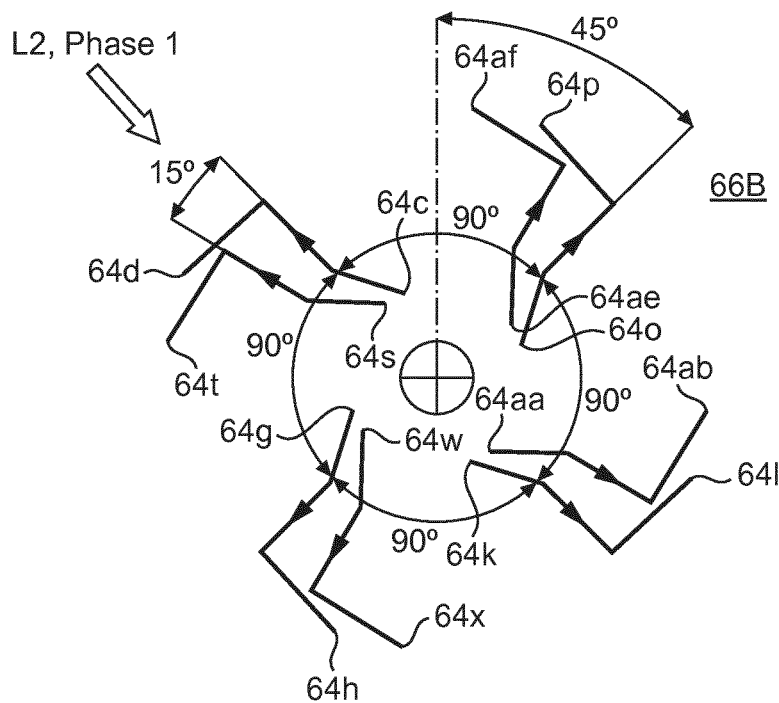
FIG. 5 shows said stator of the appliance, in particular a first phase arranged on a second face of said stator.

On a second face 66B the elements 48 have a shape corresponding to those on the first face but reflected along the radial portion 50, as illustrated in FIG. 5. More particularly, the proximal portion 54 extends from the radial portion 50 with a first directional component in the second angular direction (herein clockwise) and with a second directional component radially inward. In a similar fashion the distal portion 52 extends from the radial portion 48 with first directional component in the first angular direction (herein anti clockwise) and with a second directional component radially outward. On the second face the elements 48 have a shape that generally resembles a 'Z'.

The connection of the phases between the first and second face will now be described, with reference to the examples in FIGS. 3 and 5 which illustrate an example first phase of a three phase configuration. In particular the tips of the proximal portions 50 on the first face are connected to the tips proximal portions 50 on the second face. In a similar fashion, the tips of the distal portions 52 on the first face are connected to the tips distal portions 52 on the second face. More particularly said tips comprise vias 64. The vias 64 are generally of the through hole type (e.g. extending through one or more circuit boards), however other suitable arrangements are envisaged, e.g. a blind, castellated hole type. Due to the arrangement of the corresponding distal and proximal portions with point towards each other the connections are simplified.

Figure 3:
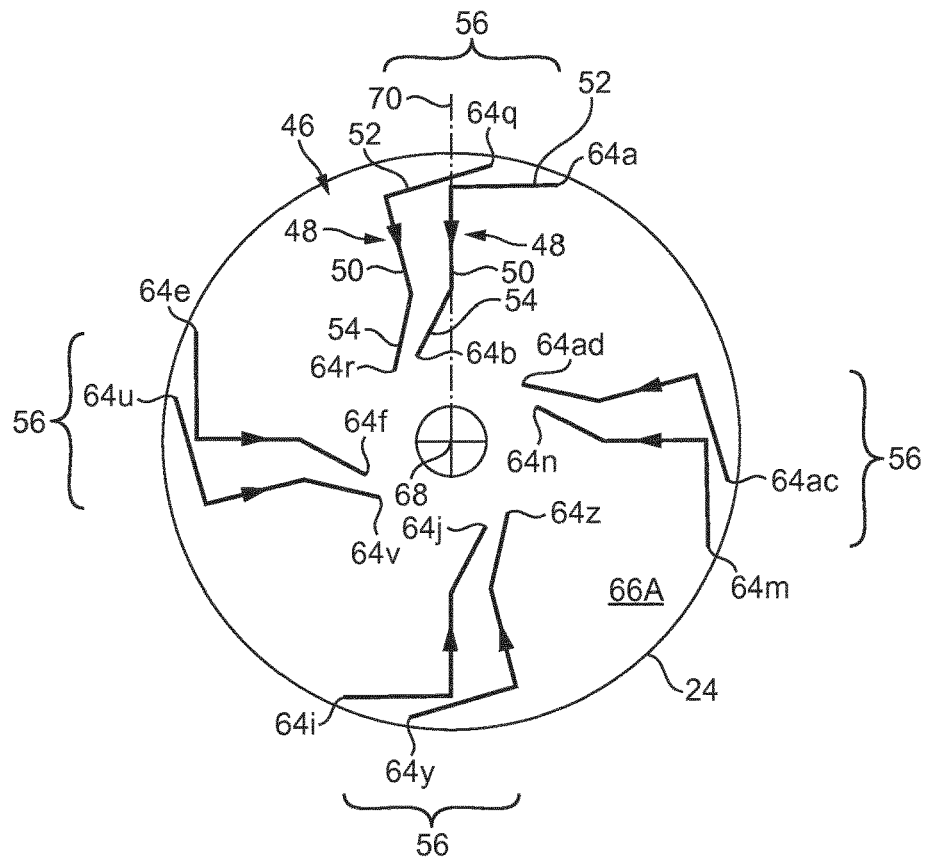
FIG. 3 shows a stator of the appliance of FIG. 1, in particular a first phase arranged on a first face of said stator.
Figure 4:
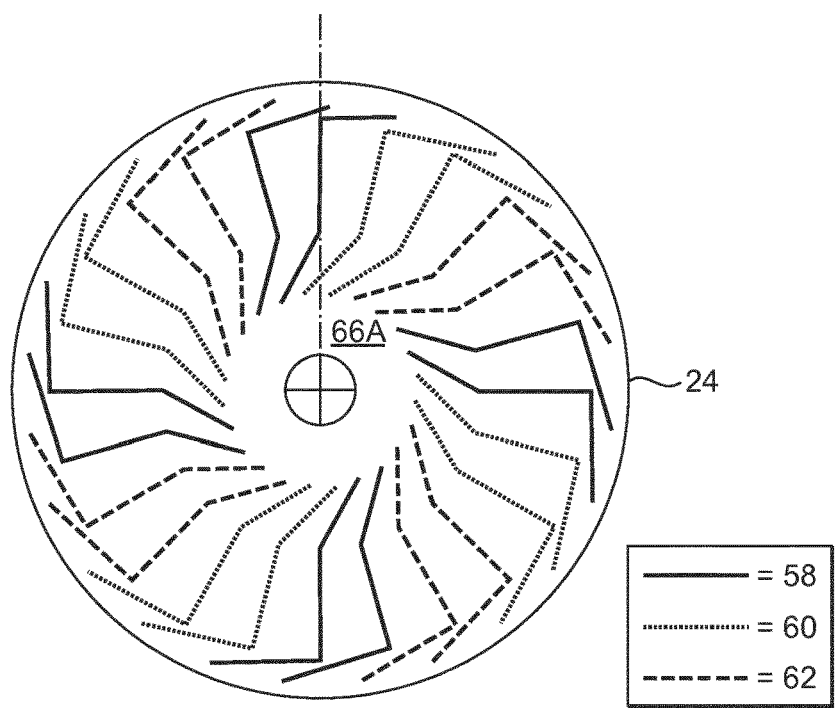
FIG. 4 shows phases 1-3 arranged on said first face of said stator.
Figure 6A:
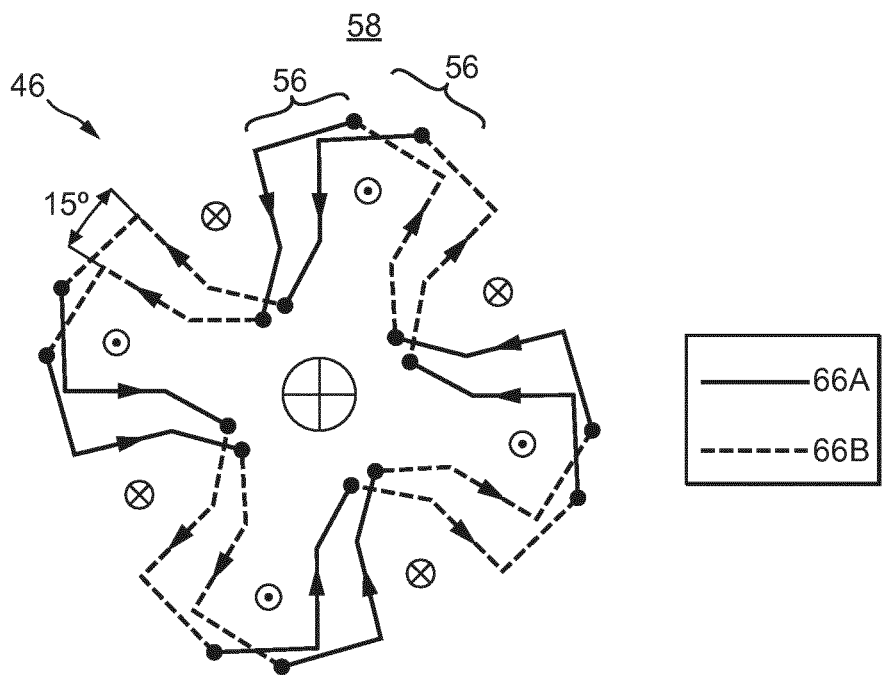
FIG. 6a is an illustrative diagram of phase 1 derived from the supposition the phase of FIGS. 3 and 5.

Referring to the example in FIGS. 3 and 5, the via 64a-64af show sequentially the interconnection of the via 64 and the resultant current flow direction according to conventional flow notation. In the example the current enters the circuit comprising phase 1 at via 64a and exits at via 64af. In particular via 64p connects to via 64q to connect the circuit of the most clockwise elements 48 of the arrangement 56 to the circuit of the most anticlockwise of the elements 48 in the arrangement 56. Alternatively, the two circuits may not be connected i.e.: the current enters a first circuit of phase 1 at via 64a and exits at via 64p; and the current enters a second circuit of phase 1 at via 64q and exits at via 64af. FIG. 6a shows schematically for the first phase only the interconnection of the elements on the first face 68A superposed with those on the second face 68B.

Such an arrangement of the vias 64 is particularly advantageous since they are kept away from the radial portions 50 and regions proximal thereto of the distal portions 52 and proximal portions 54, which form active portions that define the poles of the stator 24. In this way the efficiency of the stator in increased.

It will be appreciated that the elements on a face can be configured for: any suitable number of phases; a particular number of poles; and a particular number of elements in an arrangement 56, by their connection.

Figure 6B:
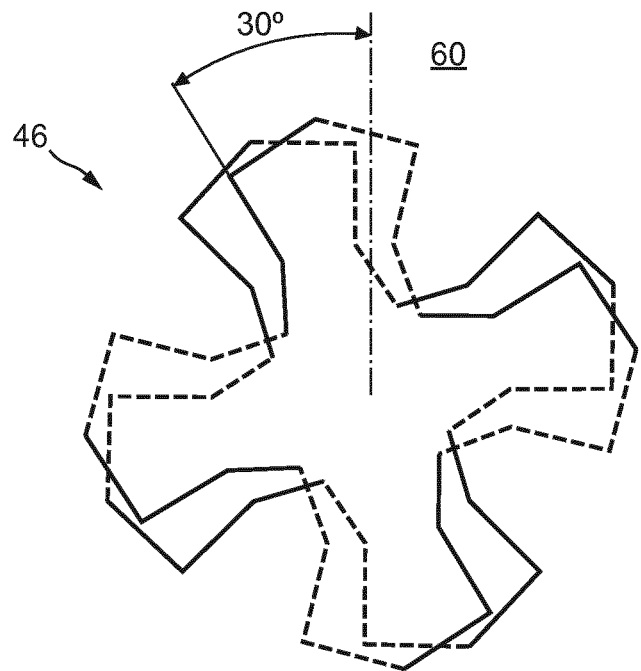
Figure 6C:
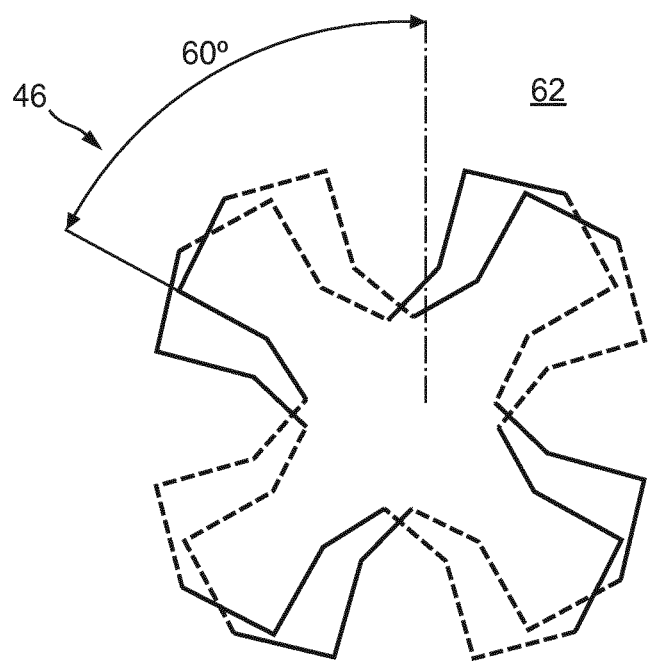
Figure 6D:
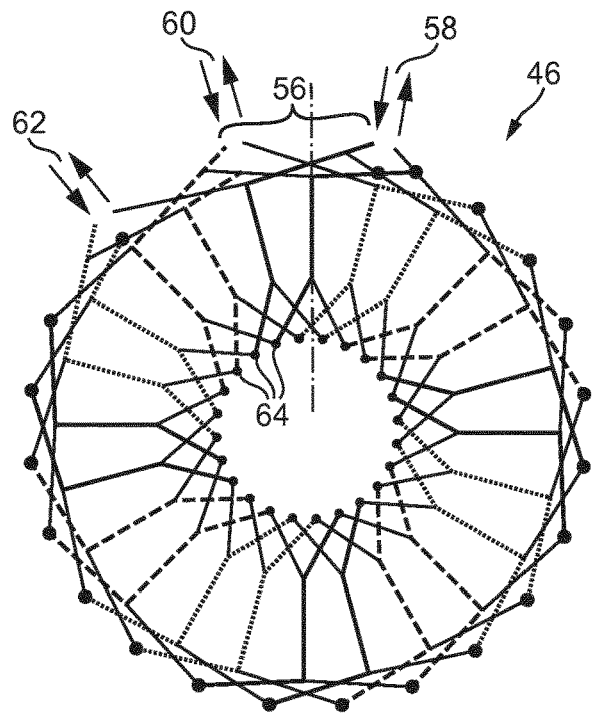
FIG. 6d is an illustrative diagram showing the supposition of FIGS. 6a-6c, showing a 2 face arrangement.

Referring in particular to the illustration of FIG. 6a, wherein the current flow direction is illustrated according to conventional flow notation, it can be seen that the arrangements of elements 48 on the first 66A and second face 66B cooperate to define active portions that define the poles of the stator 24. In particular the direction of the magnetic field vector is illustrated. In the example there are 8 magnetic poles, i.e. 4 pole pairs. In particular the active portions are serially interconnected between the faces and configured to generate magnetic poles of alternating polarity. FIGS. 6b and 6c show the corresponding illustration for the second and third respective phases, whereby the illustration of FIG. 6a is effectively rotated by 30° and 60° respectively. FIG. 6d shows an illustration of phases 1-3 superposed for the first and second face.

Figure 7A:
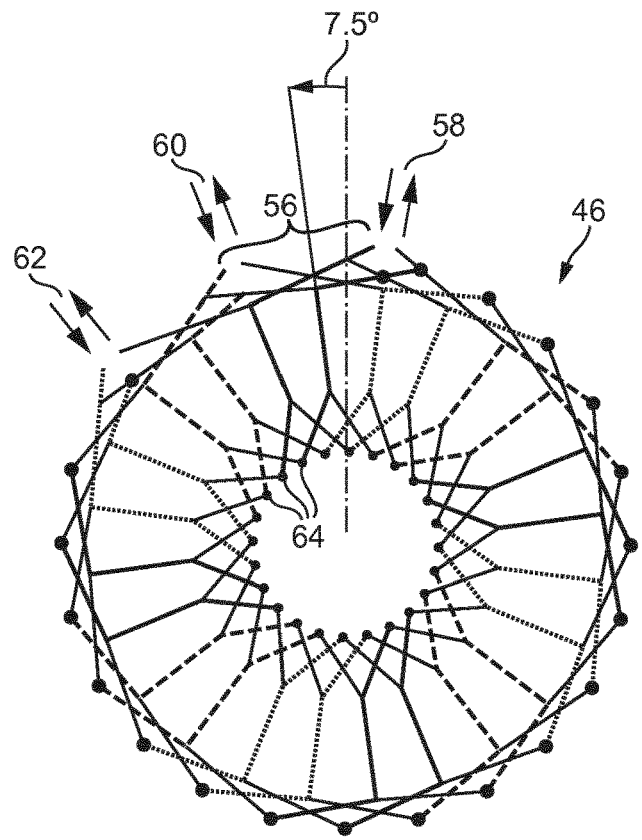
FIG. 7a is an illustrative diagram corresponding to FIG. 6d, but rotated through 7.5°, to provide two additional face arrangements.
Figure 7B:
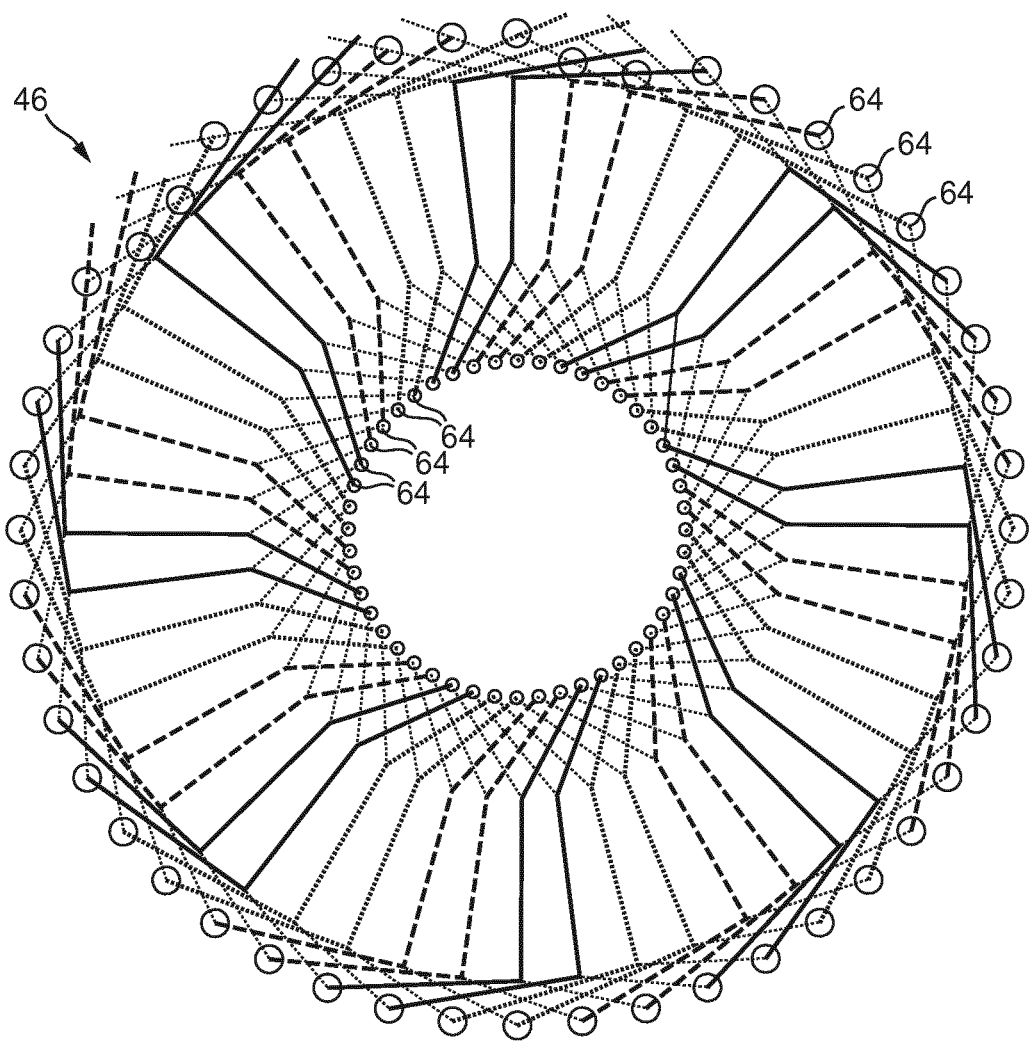
FIG. 7b is a supposition of FIGS. 7a and 6d, showing a four face arrangement.

In the above the phases have been described as being distributed over 2 faces of one or more circuit boards, in alternative examples the phases may be distributed over more than two faces, i.e. to derive a stator operable to apply increased field strength and thus torque. An example of the latter configuration comprises 4 faces, e.g. with two circuit boards as a laminate and all faces utilised, or with four circuit boards and a single face of each utilised. More particularly, such an arrangement can be achieved by rotating the phase illustration of FIG. 6d by 7.5° (or other suitable amount such that for each phase the corresponding radial portions 48 are aligned with each other and/or or rotationally offset in operative proximity to define the same active portion). FIG. 7a shows the equivalent of the phase illustration of FIG. 6d when rotated through 7.5°, in the anticlockwise direction and FIG. 7b shows the resultant four face supposition of FIGS. 6d and 7a. It will be appreciated that further faces can be added in such a manner.

Where the stator 24 comprises a plurality of circuit boards, whereby adjacent faces of the circuit boards comprise electrically conductive portions 46, it will be appreciated that adjacent faces of said boards can be electrically isolated by means of an electrically insulating coating such as a glass fibre epoxy resin, e.g. prepreg TU-768 or TU-768P by Taiwan Union Corporation Technology.

An advantage of the aforedescribed arrangements is that the phases are symmetrically disposed about a central plane, the central plane being arranged centrally in a through-thickness direction of the one or more circuit boards. Such a symmetric arrangement results in a more uniform transfer of torque to the rotary agitator together with increased efficiency.

The processor 36 is configured to control the current applied through the phases. The angular frequency of the generated magnetic field may be variable and/or constant, i.e. a phase locked loop, with a reference frequency. The position of the rotor, e.g. the rotary agitator 8 can be commutated by position sensors such as an: optical encoder; magnetic encoder (e.g. a resolver, synchro etc.); hall effect sensor, with the latter being preferable due to cost and size.

The aforedescribed stator may be incorporated in electrically rotating machines other than the appliance for foaming a liquid described herein. For example, the electrical rotating machine may comprise a motor, such as a pancake or axial rotor motor. The electrical rotating machine may alternatively comprise an electrical generator.

| LIST OF REFERENCES | |
|---|---|
| 2 | Appliance |
| 4 | Base Unit |
| 10 | Housing |
| 20 | Body |
| 22 | Base |
| 12 | Container mounting portion |
| 14 | Agitation system |
| 24 | Stator |
| 44 | Circuit board |
| 66 | Face |
| 46 | Electrically conductive portion |
| 58, 60, 62 | Phase 1-3 |
| 56 | Arrangement of elements |
| 48 | Element |
| 50 | Radial portion |
| 52 | Distal portion |
| 54 | Proximal portion |
| 64 | Vias |
| 26 | agitator magnets |
| 28 | agitation portion (of agitator 8) |
| 30 | Core |
| 16 | Heater |
| 18 | Control system |
| 32 | User interface |
| 34 | Sensors |
| 36 | Processor |
| 38 | Power supply |
| 6 | Container |
| 8 | Rotary Agitator |
| 40 | Body |
| 42 | Support portion |
| 26 | agitator magnets (of agitation system 14) |
| 28 | agitation portion (of agitation system 14) |

The invention claimed is:

1. A method of foaming a liquid for consumption using an appliance operable to generate a rotating magnetic field for an electrical rotating machine, the appliance comprising a stator comprising at least one circuit board with electrically conductive portions formed thereon, the electrically conductive portions connected with a multiphase configuration, wherein the electrically conductive portions comprise first electrically conductive portions arranged on a first face of the at least one circuit board as a plurality of first elements, at least one of the plurality of first elements comprising a radially extending radial portion having connected at a proximal end thereof a proximal portion, the proximal portion extending therefrom with a directional component in a first angular direction, and connected at a distal end thereof of a distal portion, the distal portion extending therefrom with a directional component in a second opposed angular direction, whereby proximal and distal are defined relative the center of rotation of the magnetic field and said angular direction is defined about said center of rotation; and the electrically conductive portions further comprising second electrically conductive portions arranged on a second face of the at least one circuit board as a plurality of second elements, whereby the proximal portion of the second elements extends with a directional component in the second opposed angular direction and the distal portion of the second elements extends with a directional component in the first angular direction, the method comprising:

generating the rotating magnetic field by applying electrical energy to the electrically conductive portions of the stator; and rotating a rotary agitator arranged in a container for container liquid by applying a torque from the rotating magnetic field to the rotary agitator.

2. The method of claim 1 wherein the first elements on the first face have an S-shape, the second elements on the second face have a Z-shape.

3. The method of claim 1 wherein the proximal portions on the first face are connected to the proximal portions on the second face.

4. The method of claim 1 wherein the distal portions on the first face are connected to the distal portions on the second face.

5. The method of claim 1 wherein the multiphase configuration comprises connections between the electrically conductive portions, the connections comprising vias which extend through the at least one circuit board.

6. The method of claim 1 wherein at least one of the plurality of first elements or the plurality of second elements comprises adjacent elements on the same face as each other and having an offset in the angular direction by 5-20 degrees.

7. The method of claim 1 wherein each of the first and second faces comprises interconnected arrangements of least two elements of the same configuration arranged adjacent each other on the same face.

8. The method of claim 1 wherein the stator extends over at least a portion of a base of the container.

9. The method of claim 1, wherein the appliance further comprises the container and the rotary agitator, wherein the rotary agitator comprises one or more agitator magnets defining magnetic poles for transmission of the torque to the rotary agitator from the rotating magnetic field.

\* \* \* \* \*